Nov. 26, 1963 W. V. COHEN 3,112,356
BENZOIC ACID ESTER DIELECTRIC COMPOSITIONS AND
ELECTRICAL APPARATUS IN COMBINATION THEREWITH
Filed April 28, 1961
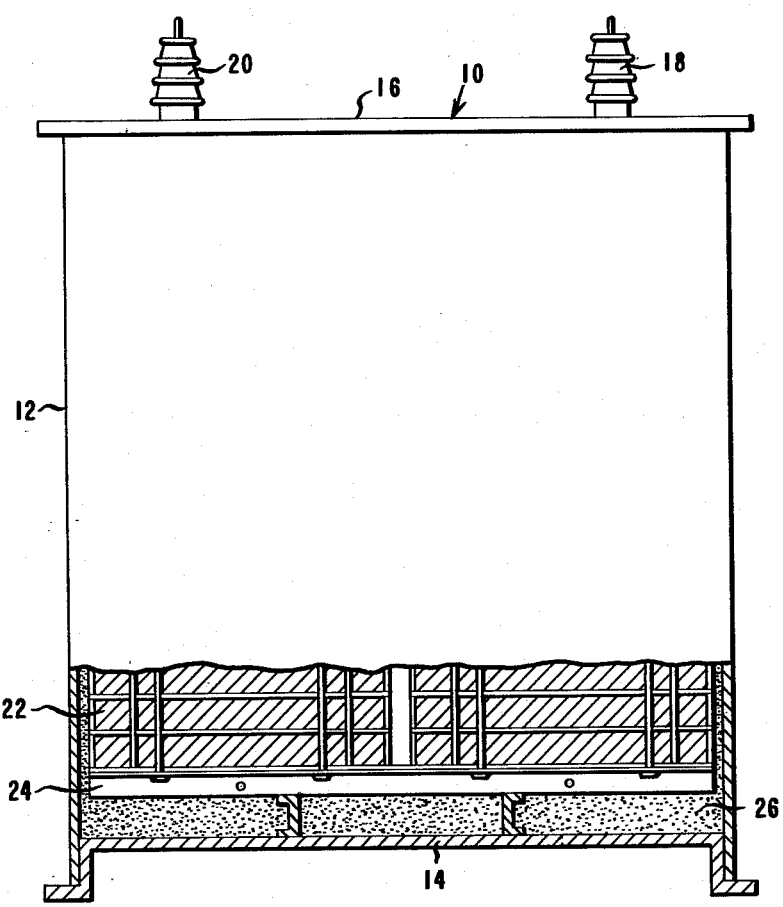
INVENTOR
WERNER VICTOR COHEN
BY
ATTORNEY United States Patent Office 3,112,356
Patented Nov. 26, 1963

3,112,356
BENZOIC ACID ESTER DIELECTRIC COMPOSITIONS AND ELECTRICAL APPARATUS IN COMBINATION THEREWITH
Werner Victor Cohen, Glen Farms, Md., assignor to E. I. du Pont de Nemours and Company, Wilmington, Del., a corporation of Delaware
Filed Apr. 28, 1961, Ser. No. 106,364
6 Claims. (Cl. 174—17)

This invention is directed to certain novel dielectric materials and compositions containing said materials. More particularly, the present invention relates to alkyl and aralkyl esters of certain ortho-substituted benzoic acids having a high dielectric constant and other properties that well adapt them for use as dielectrics. The new and useful dielectrics of the present invention are represented by the formula

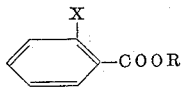

where X is acetyl, propionyl, benzoyl, bromine, chlorine, or fluorine, and, R is an alkyl radical having 1 to 10 carbon atoms, an alicyclic group, or an aralkyl radical having a single aromatic ring. These compounds have an unexpectedly high dielectric constant, good thermal stability, and low vapor pressure and are valuable for use as dielectrics themselves, as components of compositions of mixed synthetic dielectric materials, and as impregnants in liquid-impregnated paper dielectric compositions utilized in electrical equipment.

In designing and developing electrical equipment such as capacitors, cables, electronic devices, rotating machinery, switchgear, transformers and the like, there is a significant need for dielectrics with higher dielectric constants and other improved properties than those possessed by materials already in use. Dielectrics are needed, for example, to store electrical energy in capacitors, to sustain high voltages in cables, to insulate one conducting element from another in electronic devices and in rotating machinery, to interrupt the arc in switch-gear, and to cool transformers. The requirements for such dielectrics are, among other things, high resistance to the flow of electric currents, high stability to atmospheric conditions at ordinary and at somewhat elevated temperatures, high resistance to thermal decomposition, low vapor pressure, low pour point, low inflammability, and high flash point.

Mica is extensively used as a dielectric, although it cannot be used as an impregnant. As a capacitor dielectric mica has been satisfactory because of its high dielectric constant (7 to 8), its low power factor (about 0.1%), and the property of splitting into thin sheets of uniform thickness. Major disadvantages of mica are the limited size of individual sheets of the material, their high cost of preparation, and the relatively low voltage at which gas ionization leading to breakdown occurs in mica capacitors. Impregnation of mica capacitors is difficult owing to the imperviousness of mica.

Among the commonly used liquid dielectrics and dielectric impregnants are petroleum oil and chlorinated aromatic hydrocarbons. Petroleum oil is widely used as a dielectric particularly in transformers, switchgears, and capacitors, but petroleum oil has a relatively low dielectric constant (about 2), is a poor heat transfer agent, decomposes when subjected to electric discharge, and gradually forms tarry products and sludge deposits that adversely affect the electrical properties. Among the decomposition products are gases that present fire and explosion hazards. Highly chlorinated aromatic hydrocarbons as dielectrics offer several advantages over petroleum oil and have permitted marked electrical engineering advances to be made. This class of compounds has a dielectric constant (5 to 6 at 25° C.) over twice that of petroleum oil, is flameproof, does not give off flammable or explosive gases, and makes possible a large reduction in the size of capacitors. Such a size reduction results in a lower cost of the finished unit even though the synthetic dielectric may cost several times more than the petroleum oil it replaces. When a power distribution capacitor is reduced in size, for example, to one-half that of the older oil-impregnated unit, not only is half as much dielectric required but only about one-half as much paper, aluminum foil, steel for the container, etc. are needed. The reduced weight and decreased size of the capacitor provide obvious advantages in its storage, handling, and ultimate use. In transformers when the chlorinated aromatic hydrocarbons are subjected to arcing they give off hydrochloric acid gas which attacks the cellulosic insulation. The effect on cellulose, while partially corrected by the use of acid absorbing agents such as tin tetraphenyl, is a condition to be further corrected. The chlorinated aromatic hydrocarbons have high solvent power for most varnishes and some insulating materials so care must be taken in the selection of varnishes and other materials used in the chlorinated hydrocarbon-filled transformers and capacitors.

It is an object of the present invention to provide novel dielectric materials for the insulation of elements in electrical equipment wherein a medium having an unusually high dielectric constant is required. Another object is to provide a high dielectric for electrical equipment having a long useful life. A still further object of this invention is to provide a dielectric for capacitors that permits an economical and useful reduction in the size and weight of the units without sacrificing the construction and performance features that prolonged life and service require. These and other objects will become apparent in the following description and claims.

The heretofore described objects are attained with the novel dielectric materials and compositions containing said materials of the present invention, that is, certain esters of benzoic acid having selected ortho-substituents. These new dielectrics have a dielectric constant in the range of 8 to 25; a resistance to thermal decomposition; no tendency to give off corrosive, or cellulose-degrading products; a low vapor pressure; and a high flash point. These dielectrics are particularly well adapted for use in capacitors in which a material with a high dielectric constant allows substantial reduction in the unit size of the equipment.

More specifically, the present invention is directed to electrical apparatus comprising, in combination, metallic conducting elements disposed in spaced relationship to each other and adapted during operation of said apparatus to have a difference in electrical potential therebetween and, interposed between said elements for insulating one from the other, a dielectric material consisting essentially of an ortho-substituted benzoic acid ester of the formula

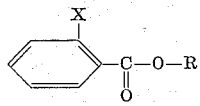

wherein X is a member selected from the group consisting of acetyl, propionyl, bromine, chlorine, fluorine, and benzoyl, said benzoyl member may be substituted by a member selected from the group consisting of methyl, chlorine, bromine and fluorine; and, R is a member selected from the group consisting of an alkyl radical having 1 to 10 carbon atoms, an alicyclic radical and an aralkyl radical having a single aromatic ring, said dielectric having a dielectric constant of at least 8. The present invention also contemplates the method of operating electrical apparatus in combination with the dielectric material heretofore described.

The present invention also encompasses dielectric compositions comprising (1) one or more of the heretofore described ortho-substituted benzoic acid esters and (2) a chlorinated aromatic hydrocarbon selected from the group consisting of a chlorinated monocyclic aromatic hydrocarbon and a chlorinated dicyclic aromatic hydrocarbon, said benzoic acid ester or esters constituting not less than 10% by weight of said dielectric composition.

The preferred dielectric material according to the present invention comprises propyl o-benzoylbenzoate. A dielectric composition comprising propyl o-benzoylbenzoate and tetrachlorobiphenyl isomers, the benzoate part of this composition constituting not less than 10% by volume of said composition, represents another preferred embodiment of this invention. Two other representative preferred dielectric materials of the present invention comprise (1) propyl o-acetylbenzoate and (2) propyl o-chlorobenzoate.

Representative ortho-substituted benzoic acid ester dielectrics of the present invention which have a dielectric constant of at least 8 are:

(1) o-Acylbenzoic acid esters—
  Benzyl o-acetylbenzoate
  Propyl o-acetylbenzoate
  Cyclohexyl o-acetylbenzoate
  Ethyl o-propionylbenzoate
  Butyl o-propionylbenzoate
(2) o-Aroylbenzoic acid esters—
  Ethyl o-benzoylbenzoate
  Propyl o-benzoylbenzoate
  Benzyl o-benzoylbenzoate
  Isopropyl 2-m-toluoylbenzoate
  2-methylpentyl 2-p-toluoylbenzoate
   Ethyl 2',4'-dichloro-2-benzoylbenzoate
   Propyl 4'-bromo-2-benzoylbenzoate
   Butyl 4'-bromo-2-benzoylbenzoate
   Methyl 2'-fluoro-2-benzoylbenzoate
(3) o-Halobenzoic acid esters—
  Methyl o-bromobenzoate
  Propyl o-bromobenzoate
  Ethyl o-chlorobenzoate
  Propyl o-chlorobenzoate
  Isopropyl o-chlorobenzoate
  Methyl o-fluorobenzoate
  Propyl o-fluorobenzoate
  Cyclohexyl o-fluorobenzoate
  Tert-butyl o-fluorobenzoate
  Benzyl o-fluorobenzoate The alkyl o-benzoylbenzoates may exist in two forms. One of these is the normal form having the structure

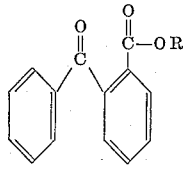

and the other is the pseudo form having the structure

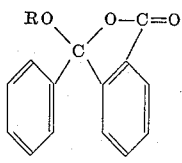

The two forms are distinguished by infrared spectroscopy. While the pseudo ester has a single carbonyl absorption peak at about $5.60\mu$, the normal ester has two carbonyl peaks, one at about $5.78\mu$ (carboxylic ester carbonyl) and the other at about $5.95\mu$ (diaryl ketone carbonyl). Mixtures of the two ester forms show all three peaks.

The o-acetyl- and o-propionyl benzoates may similarly have the normal and the pseudo structures.

Chlorinated aromatic hydrocarbons may be mixed with one or more of the dielectric benzoate esters of this invention to compose dielectric compositions. They include benzene, toluene, alkyl ($C_2$ to $C_4$) benzenes, and biphenyl having 3 to 5 substituted chlorine atoms in the ring structure of the respective hydrocarbons, particularly the mixed isomers of these chlorinated compounds. Among the representative chlorinated hydrocarbons we may use are the isomers of the following:

Trichlorobenzene
Ethyltrichlorobenzene
Isopropyltrichlorobenzene
Ethyltetrachlorobenzene
Butyltetrachlorobenzene
Trichlorotoluene
Tetrachlorotoluene
Trichlorobiphenyl
Tetrachlorobiphenyl
Pentachlorobiphenyl
Mixed tri- and tetrachlorobiphenyls
Mixed tetra- and pentachlorobiphenyls
Mixed tetrachlorobiphenyl isomers and trichlorobenzene isomers and the like One may also mix, with the dielectric benzoate esters of this invention, ethylpentachlorobenzene, butylpentachlorobenzene, pentachlorotoluene and any specific isolated isomer of chlorinated benzene, toluene, or alkyl ($C_2$ to $C_4$) benzene having three or four chlorine atoms.

The ortho acyl, aroyl and halobenzoic acid esters of the present invention are prepared by reacting a respective o-substituted benzoic acid with thionyl chloride or phosphorus pentachloride to form the benzoic acid chloride and then combining the acid chloride with an alkanol, cycloalkanol, or benzyl alcohol. The esters may also be prepared by an acid-catalyzed esterification of the o-substituted benzoic acid with a selected alcohol. o-Benzoylbenzoic acid is available commercially and o-acetyl, o-bromo-, o-chloro-, and o-fluorobenzoic acid may be purchased from chemical suppliers. The preparation of o-propionylbenzoic acid is described in Beilstein, 10, 701; $10^I$, 333.

The o-benzoylbenzoic acid chloride exists in the pseudo form

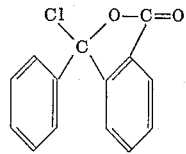

(Helvetica Chimica Acta, 42, 1085 (1959))

On reaction with an alcohol the pseudo form of the acid chloride tends to yield the pseudo form of the ester

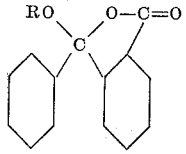

The pseudo ester is unstable in the presence of an excess of thionyl chloride and alcohol and in the presence of acid and becomes converted to the normal form. The presence of the pseudo isomer has a pronounced favorable effect on the dielectric constant as shown below.

To have the required electrical properties, the dielectric o-substituted benzoates of this invention must be purified to a high degree. A high purity is of utmost importance because ionic impurities and moisture lead to a loss of electrical energy in the form of heat when the compounds are used as dielectrics. Such an energy loss is measured by the power factor. The procedures used for purifying the subject benzoates include distillation, water washing to remove acidic and other ionic impurities, the use of ion exchange resins and electrolytic techniques, and drying in absorption columns. The absorption columns may contain one or more of such moisture absorbents as silica gel, basic alumina, calcium hydride, sodium-calcium aluminosilicates.

The present novel dielectric benzoates utilized according to the present invention, or novel dielectric compositions containing them, may be treated with small amounts of oxidation stabilizing agents; they may also be treated with acid or metal deactivating agents without impairing the usefulness of the compounds or compositions as dielectrics.

The dielectric benzoate esters of this invention having a high dielectric constant may be used as dielectrics by themselves or in dielectric compositions in many types of electrical equipment such as capacitors, cables, electronic equipment, rotating machinery, switchgear, transformers. One of the uses for which the new dielectrics are particularly well adapted is as a dielectric in capacitors. The high dielectric constant of these compounds makes possible a substantial reduction in the size and construction cost of a capacitor. The benzoate esters may also serve as an impregnant for high voltage cables, may be used as a filling compound for transformers and switchgear, and may be the impregnant in insulating compositions for electronic equipment and other electrical devices.

Typical electrical apparatus which may be utilized in the practice of the present invention is found in U.S. Patents 2,886,625; 2,849,525; 2,774,807; and 2,777,009.

Representative examples illustrating the present invention are as follows.

EXAMPLE 1.—PROPYL o-BENZOYLBENZOATE AS DIELECTRIC

A two-terminal unshielded electrical measuring cell was filled with propyl o-benzoylbenzoate and its capacitance measured by placing the cell in a constant temperature bath at 25° C. and connecting it to an electrical circuit comprising a capacitance bridge of the Schering type, an A.C. oscillator, a cathode ray oscilloscope, and a variable air condenser used as ballast capacitance. The assembled measuring cell had a volume of 7 ml., an overall length of 7 in. and air capacitance of 24.2 $\mu\mu f$. It consisted of an outer Pyrex type glass tube having a ground glass joint which supported an inner electrical assembly. This electrical assembly included four concentric nickel cylinders spaced 50 mils apart and having outside dimensions of 21 mm. in length by 16 mm. in diameter. Alternate cylinders were connected by nickel prongs to form two electrodes. These were attached to leads extending through an inner glass tube having at the top the inner seal of the ground glass joint. The leads terminated as external connections. From the measurement of the capacitance of the cell empty (i.e. with air) and then filled with propyl o-benzoylbenzoate the dielectric constant of the benzoate was calculated using the equation $$\frac{C_k - C_e}{C_a} + 1 = E$$

where $C_k$ = observed capacitance of cell containing material when measured at the terminals (includes the capacitance of the leads and a ballast capacitance of 100 $\mu\mu f$.).

$C_e$ = observed capacitance of cell containing air when measured as $C_k$ was measured = 126 $\mu\mu f$.

$C_a$ = capacitance of cell containing air minus ballast capacitance and capacitance of leads = 24.2 $\mu\mu f$.

At 28° C. and at 200 to 1000 cycles the capacitance of the cell containing propyl o-benzoylbenzoate, $C_k$, was 394 $\mu\mu f$. which gave a dielectric constant as calculated by the above equation of 12.1, an unexpectedly high value that makes this compound especially useful as a dielectric. In comparison, the $C_k$ value of a mixture of tetrachlorobiphenyl isomers was 241 $\mu\mu f$. from which was calculated a dielectric constant of 5.8.

EXAMPLE 2.—ELECTRICAL PROPERTIES OF o-SUBSTITUTED BENZOATES

The dielectric constant of representative alkyl and benzyl esters of the o-substituted benzoic acids of the invention at 8000 cycles and 25° C. (except when otherwise stated) as determined by the procedure of Example 1 are given in Table 1.

Table 1

| Ortho-Substituent (X) | Ester radical (R) | Dielectric Constant |
|---|---|---|
| Benzoyl | methyl, normal form (55° C.) | 12.9 |
| | ethyl, normal form (75° C.) | 11.6 |
| | propyl, normal form | 12.1 |
| | propyl, mixture of normal and pseudo forms. | 15.6 |
| | cyclohexyl, essentially normal form. | 11.6 |
| | 2-methylpentyl, essentially pseudo form. | 17.4 |
| | benzyl, normal form | 11.9 |
| Acetyl | propyl, mixture of normal and pseudo forms. | 24.6 |
| Bromine | methyl | 9.5 |
| Chlorine | do | 11.9 |
| Fluorine | ethyl | 13.2 |

The relative invariance of the dielectric constant of some alkyl o-benzoylbenzoates with increase in temperature is shown in Table 2.

Table 2

EFFECT OF TEMPERATURE ON DIELECTRIC CONSTANT OF o-BENZOYLBENZOATES

| Ester radical (R) | Temperature, °C. | Dielectric Constant, 1000 cycles |
|---|---|---|
| Methyl | 55 | 12.9 |
| | 75 | 12.7 |
| | 100 | 12.0 |
| Ethyl | 75 | 11.6 |
| | 100 | 11.4 |
| Propyl | 24 | 12.0 |
| | 100 | 11.1 |

The power factor of propyl o-benzoylbenzoate and of benzyl o-benzoylbenzoate at various frequencies at 25° C. is presented in Table 3. The power factor of a compound was calculated from the well-known relation among the capacitance of the measuring cell described in Example 1 when empty and when containing the compound, the capacitance of the leads of the cell and the directly measured power factors of the whole assembly and of the leads.

Table 3

POWER FACTOR OF SELECTED o-BENZOYLBENZOATES 25° C.

| Ester radical (R) | Frequency, kilocycles per sec. | Power Factor, percent |
|---|---|---|
| Propyl | 1 | 0.10 |
| | 8 | 0.02 |
| Benzyl | 1 | 0.05 |
| | 8 | 0.04 |

EXAMPLE 3

When propyl o-benzoylbenzoate is mixed with isomers of tetrachlorobiphenyl (a commericial product sold by the Monsanto Chemical Co. under the trade name "Aroclor" 1242) to provide a dielectric composition having a greater fluidity than the ester above and a higher dielectric constant than the chlorinated biphenyl the dielectric constant of the mixture varies linearly with its volume composition. The experimental data are:

| Propyl o-benzoylbenzoate (normal ester), parts by volume | Tetrachlorobiphenyl (isomers), parts by volume | Dielectric Constant (at 28° C.) |
|---|---|---|
| 100 | 0 | 12.0 |
| 75 | 25 | 10.3 |
| 50 | 50 | 8.8 |
| 25 | 75 | 7.3 |
| 0 | 100 | 5.9 |

Other properties of the mixtures are tabulated below.

PROPERTIES OF MIXTURES OF PROPYL o-BENZOYLBENZOATE (A) AND TETRACHLOROBIPHENYL ISOMERS (B)

| Composition, percent by vol. | 100A | 75A 25B | 50A 50B | 25A 75B | 100B |
|---|---|---|---|---|---|
| Dielectric strength, kvolt/100 mil | 29 | 30 | 30 | 36 | 36 |
| Viscosity, centistokes, ° F.: | | | | | |
| 210 | 4.98 | 4.14 | 3.40 | 2.80 | 2.37 |
| 100 | 65.9 | 50.3 | 35.3 | 24.9 | 18.1 |
| 32 | 4,100 | 3,700 | 2,600 | 1,700 | 1,500 |
| ASTM Slope | .983 | 1.021 | 1.046 | 1.073 | 1.094 |
| Pour point, ° F. (ASTM D-97) | 0 | 5 | 10 | 0 | 5 |
| Flash point, ° F. (ASTM D-92) | 405 | 410 | 400 | 380 | 370 |

EXAMPLE 4

A capacitor (shown in Dielectric Materials and Applications, A. R. Von Hippel, editor, The Technology Press of M.I.T. and John Wiley and Sons, p. 198), is made up of sections composed of alternate layers of aluminum foil separated by sheets of special kraft cellulose paper. A section is constructed by winding the metal foil and paper on a mandrel, removing the assembly, and pressing it into a flat oval shape. The section so formed is placed with a multiple number of similar sections within an insulating box and the whole assembly inserted in a metal case. Connections to the foils are made by inserting thin metal strips at the upper ends of the capacitor sections. Then the sections are connected in various series or parallel combinations by soldered flexible leads. Next, the capacitor is placed in a vacuum oven for several days to remove air and moisture and then completely impregnated with purified propyl o-benzoylbenzoate while vacuum is maintained. Finally the capacitor case is sealed. The resultant capacitor has an exceptionally high capacitance.

When the capacitor is impregnated with propyl o-acetylbenzoate as a dielectric an even higher capacitance is attained.

Similarly the capacitor may be impregnated with a dielectric composition consisting of 50% of propyl o-benzoylbenzoate and 50% of an isomeric mixture of tetrachlorobiphenyl to attain high capacitance.

The following examples (a) through (d) describe the preparation and analysis of representative specie benzoates of the present invention.

(a) Preparation of Propyl o-Benzoylbenzene in Normal Ester Form

To 452 g. (2 moles) of o-benzoylbenzoic acid in a 2-l. round bottom flank was added dropwise with agitation 290 ml. (4 moles) of thionyl chloride. The reaction mixture was heated at 40° C. for two hours, and the liberated hydrogen chloride gas was neutralized in a caustic scrubber. The stirring was continued overnight at room temperature. The excess thionyl chloride was removed by distillation at 45° C. and 7 mm. mercury pressure. The resultant o-benzoylbenzoyl chloride was then cooled to room temperature and to it was added dropwise 160 g. (2.66 moles) of 1-propanol. The temperature of the mixture was held at 40° C. for four hours and then increased to 100° C. for three hours. Distillation gave 455 g. of a yellow-orange propyl o-benzoylbenzoate product distilling at 163° to 165° C. at 0.3 mm. Redistillation at 170° C. and 0.6 mm. gave a lighter colored propyl o-benzoylbenzoate having $n_D^{20}=1.5688$ and having the normal form as shown by the presence of two carbonyl peaks at $5.78\mu$ and $5.94\mu$ and the absence of the single carbonyl peak of the pseudo form at $5.6\mu$ in the infrared spectrum. The ester was stirred with 4% adsorbent charcoal at 85° C. for one hour and filtered. The filtrate was colorless. Its chemical analysis confirmed its identity as propyl o-benzoylbenzoate.

Calculated for $C_{17}H_{16}O_3$: C—76.1%, H—5.97%. Found: C—75.8, 76.0; H—5.4, 5.7.

(b) Preparation of Mixed Normal and Pseudo Propyl o-Benzoylbenzoate

This preparation was similar to that for the propyl o-benzoylbenzoate in normal form as described above except that a lower ratio of thionyl chloride to o-benzoylbenzoic acid was employed (1.3 to 1 vs. 2 to 1) a lower reaction temperature was maintained (30° vs. 40° C.), and during the esterification the HCl was removed in a stream of nitrogen as it was liberated. The resultant mixed normal and pseudo esters after distillation had $n_D^{20}=1.5720$, and their infrared spectrum exhibited three peaks viz. at $5.6\mu$, $5.78\mu$, and $5.94\mu$, indicative of the three possible different carbonyl groups in the mixture.

(c) Preparation of Benzyl o-Benzoylbenzoate in Normal Ester Form

The procedure given in U.S. 1,988,489 and in JACS 44, 2894 (1922), was followed. A mixture of 226 g. (1 mole) of o-benzoylbenzoic acid, recrystallized from xylene, and 216 g. (2 moles) of benzyl alcohol, B.P. 205° C., was heated at reflux in a 1-liter flask for 4 hours. The temperature of the mixture in the reactor rose to 260° C. A total of 15 ml. of water was separated. The reaction mixture was distilled, and a product amounting to 277 g. collected between 220° and 236° C. at 0.01 to 0.05 mm. mercury pressure. After redistillation at 175° C. at 0.02 mm. essentially pure benzyl o-benzoylbenzoate was obtained. The product melted at 64 to 65 C., and its supercooled liquid had $n_D^{20}=1.6078$. Its infrared spectrum indicated only the normal form of the ester; the carbonyl peaks $5.78\mu$ and $5.97\mu$ were present, and the carbonyl peak at $5.6\mu$ characteristic of the pseudo form was absent.

(d) Preparation of Propyl o-Acetylbenzoate

A 500 ml. round bottom flask was charged with 98 g. (0.6 mole) of o-acetylbenzoic acid and 108 g. (1.8 moles) of 1-propanol, and through the mixture hydrogen chloride was bubbled for six hours beginning at room temperature. The temperature rose spontaneously to 37° C., but during the last hour of the reaction it was raised to 85° C. The reaction mixture was then cooled to room temperature, washed with distilled water, and washed with an aqueous alkaline solution buffered at pH 10.2. In this last washing emulsification occurred, and the ester was separated by ether extraction. The ether solution was dried over anhydrous magnesium sulfate, the ether was removed by distillation, and the ester product amounting to 66 g. and distilling at 106° to 107° C. at 0.6 mm. pressure was collected. The propyl o-acetylbenzoate had $n_D^{20}=1.5095$ and an infrared spectrum that contained the three characteristic carbonyl peaks at $5.6\mu$, $5.78\mu$ and $5.97\mu$ showing that the isolated ester was a mixture of both the normal and pseudo forms. The ester could not be crystalized by cooling; at —50° F. the material is a viscous liquid that becomes quite fluid at —35° F. The results of the confirmatory chemical analysis are:

Calculated for $C_{12}H_{14}O_3$: C—69.9%, H—6.8%. Found: C—69.8%, H—7.0%.

This invention may be practiced by using a high voltage electrical apparatus which comprises a closed container, the high voltage device contained therein and the dielectric medium surrounding the device. The device may be a transformer, capacitor, resistor or the like. A specific representative embodiment is the transformer shown in the accompanying drawing. The transformer 10 comprises an outer shell 12 fitted with a hermetically sealed bottom 14 and a sealed top 16 cooperating to produce a gas-tight enclosure for the electric operating elements of the transformer. The top 16 of the transformer is provided with bushings 18 and 20 for the high voltage and low voltage connections. The bushings are fitted with hermetic seals to prevent escape of the gases from within the casing or leakage of air into the casing if used at subatmospheric pressure. Within the casing are the windings 22, supported on a frame 24 which is fitted to the bottom 14. The space 26 within the casing surrounding the windings 22 is filled with one of the dielectric mediums herein defined. The casing may be filled with the dielectric in a variety of ways obvious to one skilled in the art.

The preceding representative examples may be varied by one skilled in the art, within the scope of the total specification disclosure, to achieve essentially the same results, both as to electrical apparatus and dielectric composition.

This application is a continuation-in-part of copending application serial number 846,809, filed October 16, 1959, and now abandoned.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Electrical apparatus comprising, in combination, metallic conducting elements disposed in spaced relationship to each other and adapted during operation of said apparatus to have a difference in electrical potential therebetween, and interposed between said elements for insulating one from the other, a dielectric material consisting essentially of an ortho-substituted benzoic acid ester of the formula

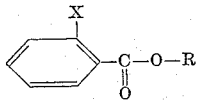

wherein X is selected from the group consisting of acetyl, propionyl, bromine, chlorine, fluorine, benzoyl and substituted benzoyl substituents, and, R is selected from the group consisting of an alkyl radical having 1 to 10 carbon atoms, an alicyclic radical and an aralkyl radical having a single aromatic ring, said dielectric material having a dielectric constant of at least 8.

2. Electrical apparatus according to claim 1 wherein the dielectric material consists essentially of propyl o-benzoylbenzoate.

3. Electrical apparatus according to claim 1 wherein the dielectric material consists essentially of propyl o-acetylbenzoate.

4. Electrical apparatus according to claim 1 wherein the dielectric material consists essentially of propyl o-chlorobenzoate.

5. A dielectric composition consisting essentially of (1) a dielectric material represented by the formula

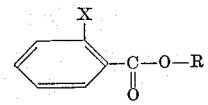

wherein X is selected from the group consisting of acetyl, propionyl, bromine, chlorine, fluorine, benzoyl and substituted benzoyl substituents, and, R is selected from the group consisting of an alkyl radical having 1 to 10 carbon atoms, an alicyclic radical and an aralkyl radical having a single aromatic ring, said dielectric material having a dielectric constant of at least 8, and, (2) a chlorinated aromatic hydrocarbon selected from the group consisting of a chlorinated monocyclic aromatic hydrocarbon and a chlorinated dicyclic aromatic hydrocarbon, said benzoate ester component constituting not less than 10% by weight of said composition.

6. A dielectric composition consisting essentially of propyl o-benzoylbenzoate and tetrachlorobiphenyl isomers, said benzoate component constituting not less than 10% by volume of said composition.

References Cited in the file of this patent

UNITED STATES PATENTS

| | | |
|---|---|---|
| 2,041,594 | Clark | May 19, 1936 |
| 2,094,453 | Jaeger | Sept. 28, 1937 |
| 2,169,012 | West et al. | Aug. 8, 1939 |
| 2,213,783 | Kyrides | Sept. 3, 1940 |
| 2,233,513 | Bruson | Mar. 4, 1941 |
| 2,236,261 | Clark | Mar. 25, 1941 |
| 2,465,316 | Mowry | Mar. 22, 1949 |
| 2,492,210 | Clark | Dec. 27, 1949 |
| 2,665,301 | Monroe | Jan. 5, 1954 |
| 2,717,899 | Cronheim et al. | Sept. 3, 1955 |
| 2,726,947 | Baumgartner | Dec. 13, 1955 |
| 2,816,134 | Toland | Dec. 10, 1957 |
| 2,839,505 | Ross et al. | June 17, 1958 |
| 2,852,470 | Henne et al. | Sept. 16, 1958 |
| 2,905,706 | Sims et al. | Sept. 22, 1959 |
| 2,910,453 | Gordon | Oct. 27, 1959 |
| 2,913,483 | Gordon | Nov. 17, 1959 |
| 2,988,679 | Dazzi | June 13, 1961 |